United States Patent [19]
Yost

[11] 3,879,285
[45] Apr. 22, 1975

[54] AEROBIC SEWAGE TREATMENT SYSTEM
[75] Inventor: Kenneth J. Yost, Eaton, Ohio
[73] Assignee: Coate Burial Vault, Inc., West Milton, Ohio
[22] Filed: Dec. 17, 1973
[21] Appl. No.: 424,549

Related U.S. Application Data
[63] Continuation-in-part of Ser. No. 241,128, April 5, 1972, Pat. No. 3,817,858.

[52] U.S. Cl. .................. 210/14; 210/15; 210/170; 210/199; 210/201; 210/220; 210/532 S
[51] Int. Cl. .......................... C02b 3/08; C02c 5/10
[58] Field of Search ............................ 210/3–9, 14, 210/15, 152, 170, 194, 198 R, 199, 201, 220, 221, 532 S; 261/109, 119 R; 55/90, 237

[56] References Cited
UNITED STATES PATENTS

| 1,349,608 | 8/1920 | Donaldson | 55/237 |
|---|---|---|---|
| 2,068,140 | 1/1937 | Jaquith | 210/532 S |
| 2,432,887 | 12/1947 | Haviland | 210/532 S |
| 2,483,564 | 10/1949 | Sitton | 210/532 S |
| 2,553,977 | 5/1951 | Mau | 210/15 X |
| 2,710,178 | 6/1955 | Froelich | 261/119 R |
| 3,403,005 | 9/1968 | Portal | 261/119 R |
| 3,462,360 | 8/1969 | McKinney | 210/15 X |
| 3,487,937 | 1/1970 | Koulovatos | 210/199 X |
| 3,732,160 | 5/1973 | Klock | 210/14 |

FOREIGN PATENTS OR APPLICATIONS
| 878,240 | 10/1942 | France | 210/170 |
| 503,336 | 6/1927 | Germany | 210/532 S |

Primary Examiner—Charles N. Hart
Assistant Examiner—Robert H. Spitzer
Attorney, Agent, or Firm—Jacox & Meckstroth

[57] ABSTRACT

Sewage water is directed into an enclosed generally circular shallow tank to expose a large surface area of the sewage water per unit volume. Air is circulated over the surface of the sewage water in a generally circular direction to effect horizontal circulation of the sewage water within the tank and diffusion of the air into the liquid. The water treated in the first aerobic tank is directed from a center outlet in the first tank into a similarly constructed second tank which also provides for horizontal circulation of the treated water and diffusion of the air in response to a generally circular flow of air. In one embodiment, the air flow within each tank is produced by connecting the air outlet of the tank to a chimney which projects upwardly adjacent the outer wall of the residence and creates a natural draft. In another embodiment, the horizontal air flow is produced by a plurality of circumferentially spaced air conduits which slope downwardly towards the surface of the sewage water and are connected to an air supply pump.

17 Claims, 12 Drawing Figures

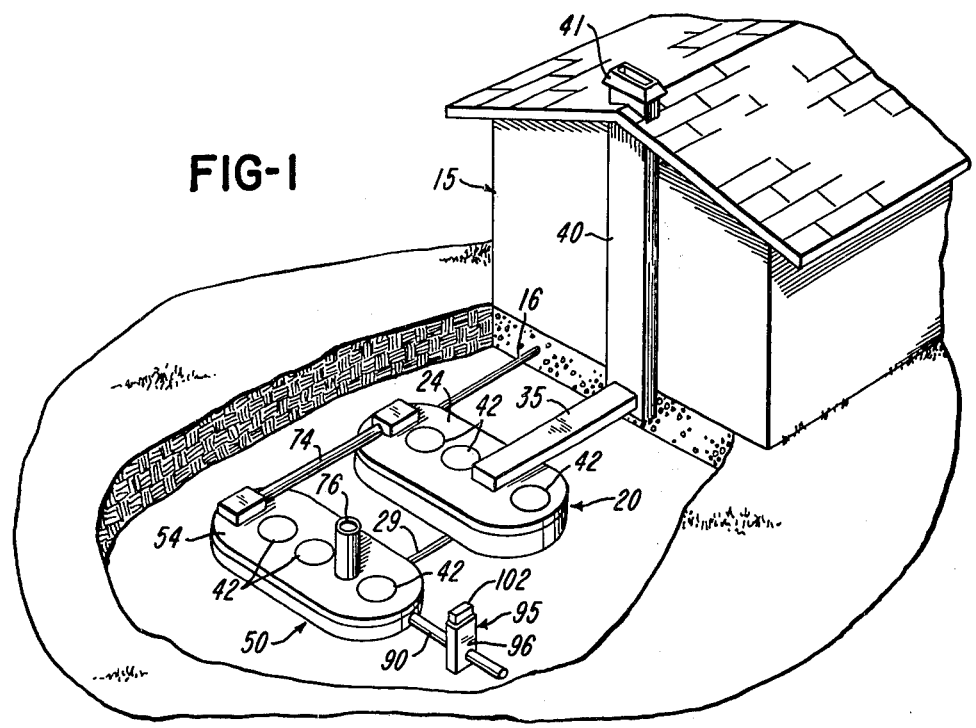
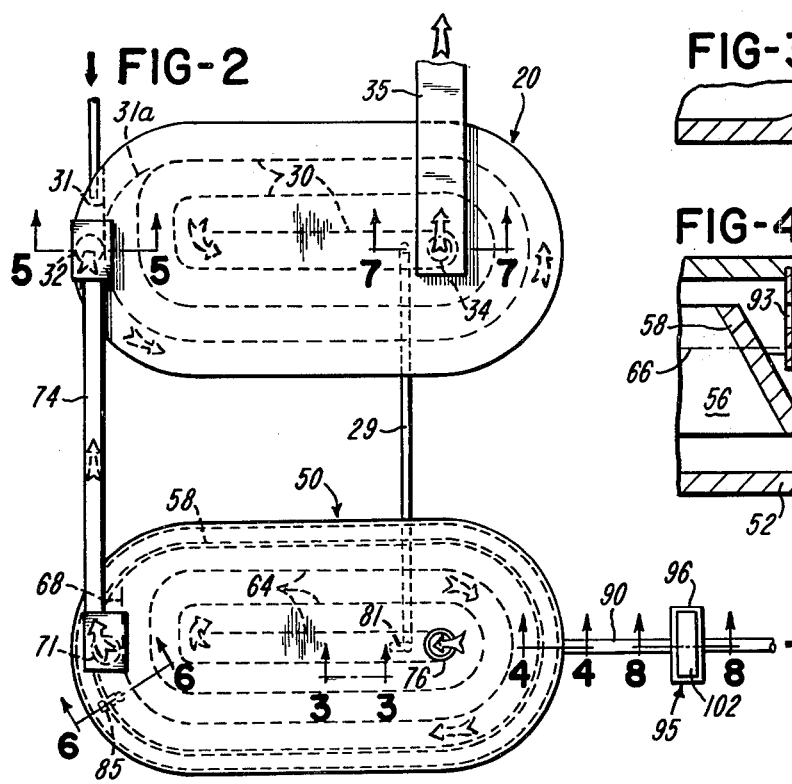

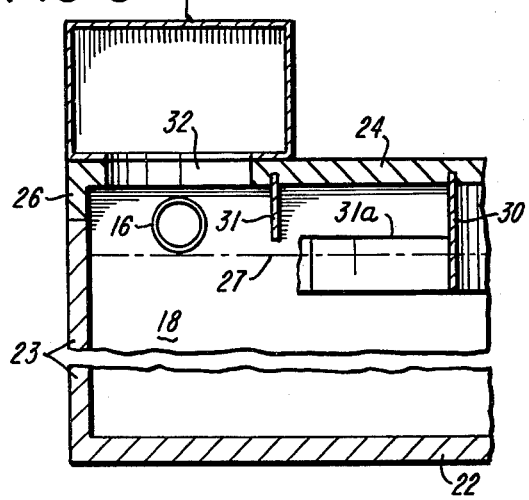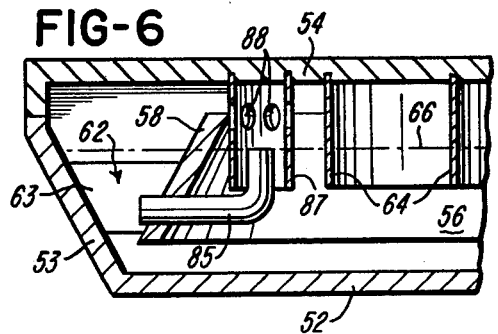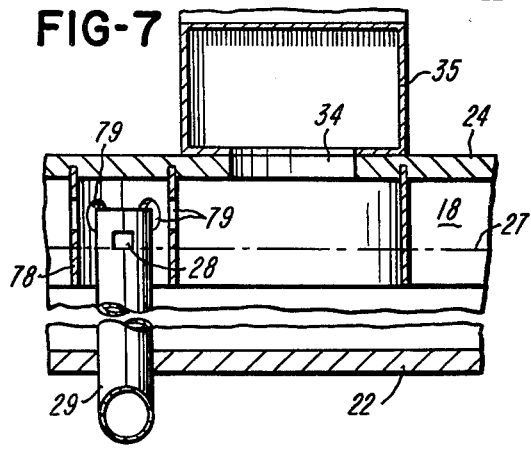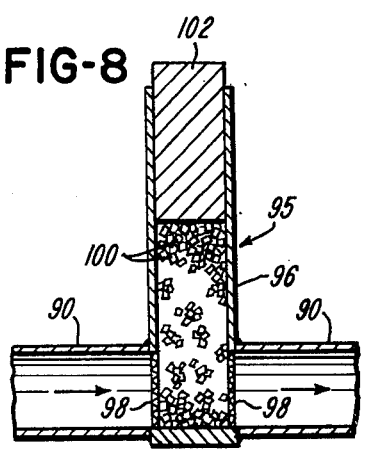

AEROBIC SEWAGE TREATMENT SYSTEM

RELATED APPLICATION

This application is a continuation-in-part of copending application Ser. No. 241,128, filed Apr. 5, 1972, now issued as U.S. Pat. No. 3,817,858 and which is assigned to the assignee of this application.

BACKGROUND OF THE INVENTION

When a public or central sewage treatment plant is not available for treating the raw sewage from a single family residence or other small apartment, commercial building or the like, it is common to use a septic tank where anaerobic bacteria action will digest usually only approximately 50% of the solids contained within the sewage. The effluent discharge from the septic tank is directed through a leaching bed, but frequently, the soil in which the leaching bed is embedded, does not have proper leaching characteristics. For example, when the soil is highly porous and contains a large percentage of sand and/or gravel, the effluent from the septic tank flows through the soil quickly and sometimes contaminates an underground water stream or adjacent lake, river, etc. On the other hand, if the soil has a high clay content and thus relatively low porosity, the effluent from the septic tank frequently percolates up onto the ground surface and creates an undesirable odor and sometimes pollutes surface water which flows into streams. In addition, the septic tank requires periodic cleaning to remove the collected solids, and occasionally the leaching bed fills up and must be reconstructed or moved.

A number of sewage treatment tanks and systems have been constructed or proposed for treating sewage by using aerobic digestion of the solid particles within the sewage. That is, air is introduced into the liquid sewage so that between 90% and 95% of the solid particles within the sewage are digested. Such aerobic digestors are generally accepted for commercial or industrial sewage treatment where regular maintenance personnel is available. However, the aerobic digestors or systems which have been used for single family or individual residence, usually present several problems. These problems primarily result from the lack of maintenance which the systems receive.

For example, U.S. Pat. No. 2,852,140, 2,889,047 and 2,987,186 each disclose a home-type aerobic digestor unit incorporating a motor driven pump, and U.S. Pat. No. 3,627,135 discloses the use of a motor driven air compressor for an aerobic sewage treatment tank. Since the units are usually recessed within the ground, the private home owner tends to forget about the operation of the unit and sometimes deliberately switches off the electrical power supply for the motor driven pump or air compressor when the unit is in need of repair. An aerobic digestor makes a very poor anaerobic digestor or septic tank, and when the motor driven pump or compressor is stopped, raw sewage enters the effluent discharge line where it can quickly pollute an underground or surface water stream. In view of the likelihood of an aerobic sewage treatment unit being operated improperly after it is installed for use with an individual residence and the serious problems which result when the unit does not operate properly, many state and local health departments prohibit the installation of such units for use in treating the sewage from an individual residence.

SUMMARY OF THE INVENTION

The present invention is directed to an improved aerobic sewage treatment method and apparatus which is ideally suited for use in conjunction with a single family or individual residence, but which may also be used for treating the sewage from other buildings such as small apartments, commercial and light industrial buildings, etc. The aerobic sewage treatment system of the invention provides the desirable advantage of minimizing the maintenance required for assuring that the system continues to operate properly by eliminating the need for any moving mechanism or air passages submerged within the sewage water. A sewage treatment system of the invention also provides for a continuous centrifuging of the sewage water in a horizontal direction without vertical circulation of the water so that polluted water with a higher specific gravity moves outwardly and downwardly, and the purest water flows through an outlet located within the upper center portion of the tank. This continuous centrifuging action and the continuous diffusion of air into the sewage water provide for a significant reduction in the biochemical oxygen demand (BOD) of the treated water along with a significant increase of the dissolved oxygen within the water and a low count of suspended solids so that the treated water may be fed directly into a surface or underground water stream without any problem of polluting the stream.

In accordance with the illustrated embodiments of the invention, the raw sewage is received within a relatively large flat oval or cylindrical tank defining an enclosed shallow chamber wherein the liquid sewage is circulated in response to a circulating flow of air directed along the top surface of the liquid sewage. In one embodiment, the air flow is produced by connecting a discharge air duct extending from the tank, to a chimney which projects upwardly above the ground level by a substantial distance, preferably adjacent or within the outer wall of the residence or house, affording a naturally induced draft. In another embodiment, the air flow is produced by a plurality of air jets directed at an inclined angle towards the surface of the water and connected to an air supply pump.

The undigestable solid particles settle within the primary or first tank, and the remaining partially treated liquid sewage is directed to a second aerobic tank of similar construction and configuration. The second tank may be connected to the first tank by an air duct so that an air flow is also created within the second tank either by the chimney effect or air supply pump and produces circulation of the partially treated water within the second tank until all of the solid particles within the water are completely digested by surface diffusion of the air, and a clear effluent is discharged from the second tank. One or more additional tanks of similar construction, may be used if desired. The clear discharge effluent may be directed through a simplified chlorinator which consists of a vertical housing in which chlorine crystals are urged downwardly by a combined valve and weight member slidably disposed within the tube.

Other particular features and advantages of the invention will be apparent from the following description, the accompanying drawings and the appended claims.

BRIEF DESCRIPTION OF THE DRAWINGS

FIG. 1 is a perspective view of a sewage treatment system constructed in accordance with the invention and illustrating its underground installation adjacent a single family dwelling unit or small apartment building;

FIG. 2 is a plan view of the sewage treatment tanks shown in FIG. 1;

FIG. 3 is a fragmentary section of the bottom wall of each tank, for example, as taken along a line 3—3 of FIG. 2;

FIG. 4 is a fragmentary section taken generally on the line 4—4 of FIG. 2;

FIG. 5 is a fragmentary section taken generally on the line 5—5 of FIG. 2;

FIG. 6 is another fragmentary section taken generally on the line 6—6 of FIG. 2;

FIG. 7 is a further vertical section taken generally on the line 7—7 of FIG. 2;

FIG. 8 is a vertical section taken generally on the line 8—8 of FIG. 2;

DESCRIPTION OF THE PREFERRED EMBODIMENT

Figure 9:
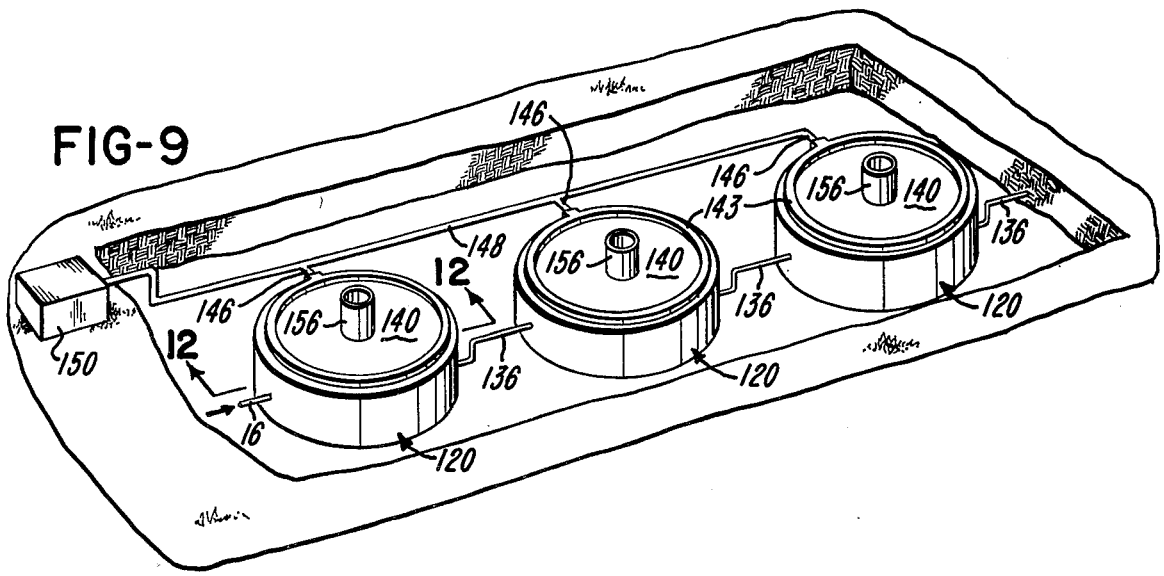
FIG. 9 is a perspective view of a modified form of sewage treatment system constructed in accordance with the invention.

Referring to FIG. 1, a sewage treatment system constructed in accordance with the invention is illustrated and described in conjunction with the liquid sewage which is generated within an individual dwelling unit or residence 15 and which is discharged from the residence through an underground line 16. However, it is to be understood that the sewage treatment system of the invention may be designed for treating the sewage discharged form other types of buildings such as small apartments and small office, commercial or industrial buildings.

The liquid sewage directed through the line 16 is received within the chamber 18 (FIG. 5) of a flat oval-shaped primary settlement and aeration tank 20 which preferably is constructed of cast reinforced concrete. The ends of the tank 20 are semicylindrical, and the line 16 enters the tank generally tangentially at one end so that the in flow of the sewage causes circulation of the sewage within the chamber 18. The primary treatment tank 20 includes an oval-shaped lower portion formed by a bottom wall 22 and an integral sidewall 23. The tank 20 also includes an upper portion formed by a flat oval top wall 24 and a depending skirt 26 which seats on the sidewall 23 and is sealed by a suitable gasket material. While not illustrated, either or both of the walls 22 and 24 may be provided with laterally extending and outwardly projecting ribs to provide additional reinforcement of the cast concrete tank.

The liquid sewage within the chamber 18 is maintained at a level indicated by the dotted line 27, as a result of the position of a series of holes 28 within the upper open end portion of an overflow pipe 29 (FIG. 7) which will be explained later. As illustrated, the tank 20 has a length of approximately 14 feet and width of approximately 7 feet, and the chamber 18 has a depth of approximately 26 inches. This relatively large flat configuration of the tank 20 provides for a substantially large exposed surface area of the liquid sewage per unit volume or gallon.

Referring to FIGS. 2 and 5, a generally spiral baffle 30 depends from the upper wall 24 of the tank 20 and projects downwardly below the surface level 27 of the liquid sewage within the tank to define a generally spiral air chamber within the tank 20 above the surface level 27 of the liquid sewage. A straight portion 31 (FIG. 2) of the baffle 30 has a lower edge located slightly above the surface level 27 so that any matter floating on top of the circulating liquid can pass under the portion 31 and remain adjacent the outer side wall 23 and in the outer spiral channel of the tank. In addition, a baffle portion 31a (FIG. 2) has an upper edge located slightly above the level 27, so that matter floating on top of the circulating liquid is restrained from following the spiral path of the air and must remain in the outer spiral channel. While the spiral baffle 30 is illustrated in the form of a molded fiberglass rib which is embedded into the concrete upper wall 24, the baffle 30 may also be constructed of other materials or be formed of concrete as an integral part of the upper wall 24.

A rectangular air inlet opening 32 (FIG. 5) is formed within the upper wall 24 of the tank 20 above the sewage inlet line 16, and a similarly shaped air outlet opening 34 (FIG. 7) is formed within the upper tank wall 24 adjacent the overflow or outlet pipe 28. The air outlet opening 34 is connected by a duct 35 (FIG. 1) to the base portion of a chimney 40 which projects upwardly substantially above the ground surface. As shown, the chimney 40 consists of a rectangular duct which extends upwardly adjacent the outer end wall of the building structure 15 and projects through an opening within the roof in a manner similar to a conventional fireplace chimney.

The chimney 40 may be constructed in other various forms, for example, as one or more ducts within the outer wall of the building or may be formed by a U-shaped vertical cover which mounts on an existing fireplace chimney and defines a vertical air chamber outboard of the fireplace chimney. The duct or chimney may also be constructed of various materials such as sections of cast concrete or molded fiberglass or sections of an extruded plastics material. Preferably, a rectangular baffle member 41 is mounted on the upper end portion of the chimney 40 and has a downwardly and outwardly sloping surace to deflect a horizontal flow of air upwardly and thereby increase the updraft within the chimney by venturi action.

A plurality of circular inspection openings are formed within the cover or upper wall 24 of the tank 20 and are closed by corresponding covers 42. These openings provide for periodically checking the aerobic action within the primary tank 20 and for occasionally pumping out the small percentage of undigestable solids which collect in the bottom of the chamber 18.

A secondary aeration and clarifier tank 50 is positioned in parallel relation to the primary aeration tank 20 and is of similar concrete construction with a length of approximately 14 feet, a width of approximately 7 feet and a depth of approximately 8 inches which is substantially less than the depth of the tank 20. The secondary tank 50 includes a bottom portion formed by a flat oval bottom wall 52 (FIG. 6) surrounded by a side wall 53 which extends upwardly and outwardly at an angle of approximately 60° relative to the horizontal bottom wall 52. A cover member or top wall 54 seats on the upper surface of the side wall 53 and cooperates with the lower or base portion to define a secondary treating chamber 56.

An annular intermediate wall 58 is positioned within the tank 50 and slopes downwardly and outwardly in converging relation with the downwardly and inwardly sloping side wall 53 to define an annular clarifying chamber 62 surrounding the treating chamber 56. The intermediate wall 58 is supported by a plurality of peripherally spaced and outwardly projecting integral ribs 63 which seat on the sloping outer or side wall 53 of the tank 50. A generally spiral baffle 64 depends downwardly from the upper wall 54 of the tank 50 in the same manner as the spiral baffle 30 within the tank 20 and projects below the surface level 66 of the liquid within the tank 50. As shown in FIG. 2, the outermost baffle 64 includes a straight portion 68 which extends into the intermediate wall 58 adjacent an air discharge opening 71 formed within the upper wall 54 of the tank 50.

An air duct 74 (FIGS. 1 and 2) connects the air discharge opening 71 within the upper wall 54 of the tank 50 to the air inlet opening 32 within the upper wall 24 of the tank 20. As will be explained later, the duct 74 provides for the flow of air from the secondary tank 50 to the primary tank 20 so that aerobic digestion is provided in both of the tanks. An air inlet duct 76 (FIG. 2) extends from the upper wall 54 of the tank 50 at substantially the geometric center of one end portion of the tank and is located directly over the innermost portion of the spiral baffle 64.

The liquid sewage treated in the primary tank 20 is directed by the line 29 (FIGS. 2 and 7) from the center of one end portion of the tank 20 to the center of the corresponding end portion of the tank 50. A cylindrical baffle 78 (FIG. 7) having vent holes 79, surrounds the upper inlet end of the pipe 29 within the tank 20 and assures that any scum floating on the surface of the liquid sewage within the tank 20 does not enter the pipe 29. The opposite end of the pipe 29 projects upwardly through the bottom wall 52 of the tank 50 and includes an elbow 81 (FIG. 2) which extends horizontally parallel to the inner run of the baffle 64.

Referring to FIG. 3, a series of generally radially extending inverted V-shaped ribs 84 are formed as an integral part of the bottom wall 52 of the tank 50 and are located at spaced intervals around the tank to create slight turbulence within the liquid sewage being treated in the tank 50 as the liquid circulates within the tank. As shown in FIG. 6, the liquid sewage treated within the chamber 56 of the tank 50 is directed by an L-shaped overflow pipe 85 from the chamber 56 through the intermediate wall 58 and to the clarifier chamber 62. A cylindrical baffle 87 having air vent holes 88, surrounds the upper inlet end of the pipe 85 to function in the same manner as the cylindrical baffle 78.

At the opposite end of the secondary tank 50, the completely digested liquid sewage or clear effluent is discharged from the clarifier chamber 62 by a discharge line 90 having an upper inlet end which is level with the bottom of the holes 28 in the upper end portion of the pipe 29 so that the liquid level 66 within the tank 50 is maintained at the same elevation as the liquid level 27 within the primary tank 20. A cylindrical baffle 92 having air vent holes 93, surrounds the upper inlet end of the discharge line 90 to assure that only clear effluent enters the discharge line 90.

Referring to FIGS. 1, 2 and 8, a chlorinator unit 95 may be installed within the discharge line 90 and includes an upright vertical container or housing 96. The lower end portion of the housing 96 intersects the discharge line 90, and a pair of parallel spaced screen members 98 are positioned flush with the inner surface of the housing 96. The housing 96 has a rectangular cross-sectional configuration and defines a chamber which receives a supply of chlorine crystals 100 which are substantially larger than the openings within the screen members 98. A combined weight and valve member 102 is positioned for vertical sliding movement within the housing 96 and is effective to urge the chlorine crystals 100 downwardly between the screen members 98 and within the flow path of the effluent discharged through the line 90. When a supply of chlorine crystals are completely consumed, the valve member 102 seats on the bottom of the housing 96 and effectively stops the flow of liquid or effluent through the line 90.

In operation, the raw sewage discharged from the building 15 through the line 16, enters one end of the tank 20 in a tangential direction above the liquid level 26, as indicated in FIG. 5. This inflow of the liquid sewage produces circulation of the sewage within the chamber 18 in a counterclockwise direction as indicated by the arrows in FIG. 2. This initial circulation of the liquid sewage is continued as a result of the natural flow of air circulating within the spiral air chamber defined between the baffles 30 and above the surface 27 and from the air inlet 32 to the air outlet 34 connected to the chimney 40.

The cross-sectional area defined between adjacent baffles 30 and between the underneath surface of the upper tank wall 24 and the surface of the liquid sewage, is significantly smaller than the cross-sectional area of the air passage within the chimney 40 so that the velocity of the air between the adjacent baffles 30 is significantly greater than the upward flow of air within the chimney 40. This flow of air between the baffles 30 spirals inwardly within the tank 20 and produces circulation or turbulence of the liquid sewage within the chamber 18. As a result of the substantial area of liquid sewage exposed to the circulating air within the tank 20, the air diffuses into the sewage to effect preliminary aerobic digestion of the sewage. The approximate 5% to 10% of the nondigestible trash and solid particles within the sewage settle to the bottom of the tank 20.

The partially digested liquid sewage within the primary tank 20 flows through the line 29 to the secondary tank 50 where the remaining portion of any small organic solid particles are completely digested by the exposure of the particles to the air flow circulating within the tank 50 between the spiral baffles 64. The upper end portion of the line 29 projecting above the normal liquid level 27 is effective to hold temporary surges of liquid sewage received within the tank 20 from the residence 15. The simultaneous circulation of the liquid and air within the tank 50 and the substantial exposure of the liquid to the air cause the air to diffuse into the liquid so that the remaining fine solid particles are aerobically digested and the liquid becomes a satisfactory bio-chemically stable effluent.

As mentioned above, a slight turbulence of the circulating liquid within the tank 50 is created by the series of laterally extending ribs 84 within the bottom wall of the tank. This turbulence assures that the fine solids particles are deflected upwardly within the liquid as the entire body of liquid circulates or orbits clockwise within the tank 50 as indicated by the arrows shown in FIG. 2. As also mentioned above, the air duct 74 is effective to conduct the air flow within the secondary tank 50 to the primary tank 20 so that the chimney 40 draws air through both tanks. However, it is apparent that the outlet air duct 35 which extends from the base of the chimney 40 may also be connected directly to the air outlet within the secondary tank 50 so that the air circulating within one tank is independent of the air circulating within the other tank.

After the liquid is completely treated within the secondary tank 50 and all of the solids are aerobically digested, the liquid flows through the pipe 85 to the clarifier chamber 62 which provides for final settlement of any particles and assures that only a clear effluent is discharged from the tank 50 through the line 90.

Another embodiment of the invention is shown in FIGS. 9-12. In this embodiment, the sewage water is discharged from a building through the line 16 and successively through a series of enclosed cylindrical aerobic digestion or treatment tanks 120. Each of the tanks 120 is formed of precast concrete and includes a cylindrical sidewall 122 which is integrally connected by a circular bottom wall 123. The water enters each of the tanks 120 through a right angle elbow 124 which directs the sewage water downwardly towards the bottom wall 123 and also in a counterclockwise direction (FIG. 10) within the cylindrical chamber 125 defined by the tank 120.

The water treated within each tank 120, flows out of the tank through a vertical overflow tube or pipe 128 located at the center of the tank. The lower end portion of the overflow pipe 128 connects with a horizontal discharge tube or pipe 131 which is embedded within a rib portion 132 of the tank bottom wall 123. The discharge pipe 131 is connected by a pair of elbows 134 and a tube or pipe 136 to the inlet elbow 124 of the next succeeding tank 120.

Each of the aerobic treatment tanks 120 includes a lid or cover member 140 which is also formed of precast concrete and has an overall diameter equal to the outer diameter of the cylindrical sidewall 122. An annular air supply tube 142 extends around the outer portion of the cover member 140 for each tank 120 and is preferably embedded within an annular rib portion 143 of the cover member 140. Each of the annular tubes 142 is connected by a corresponding radially extending air supply tube 146 to a main air supply line or manifold 148 which extends from an air supply unit 150. In the sewage treatment systems which have been tested experimentally, the air supply unit 150 included a centrifugal blower driven directly by an electric motor.

Figure 10:
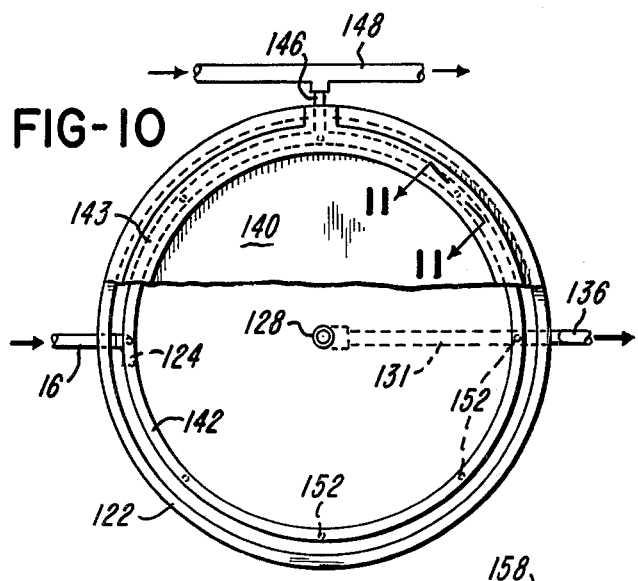
FIG. 10 is a plan view of one of the tank units shown in FIG. 9 and with a portion of the lid or cover broken away.
Figure 11:
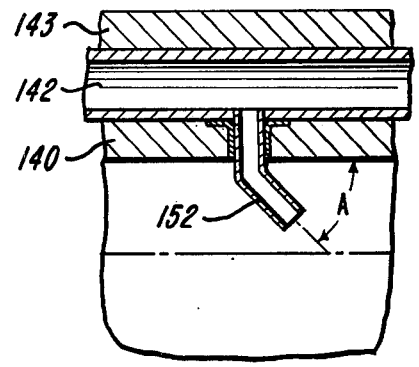
FIG. 11 is a fragmentary section view taken generally along the line 11—11 of FIG. 10.
Figure 12:
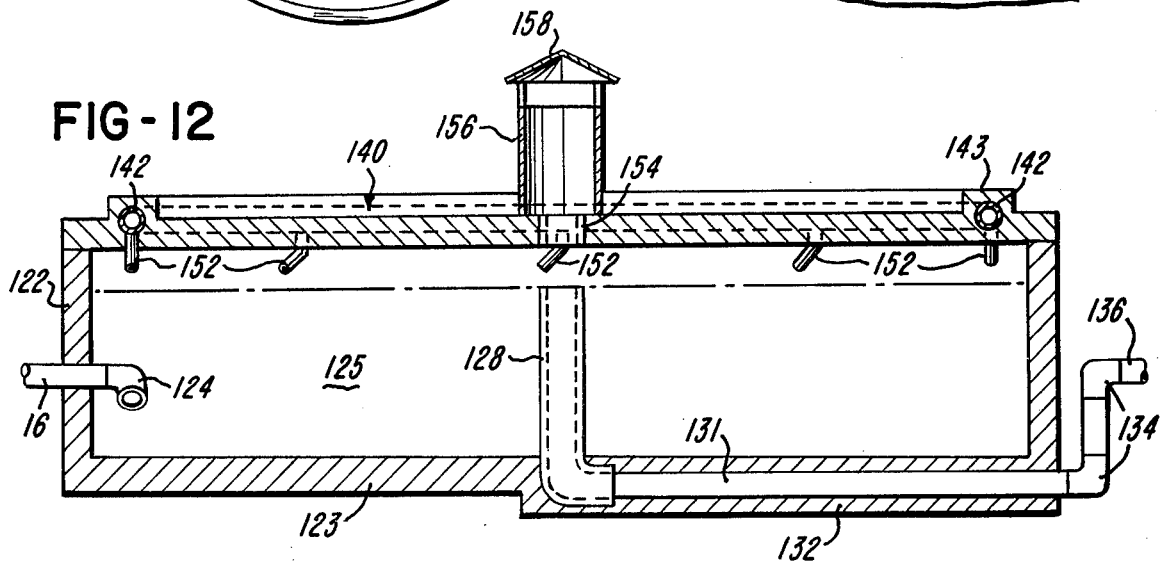
FIG. 12 is a vertical section of a tank unit as taken generally on the line 12—12 of FIG. 9.

A plurality of air nozzle tubes 152 (FIG. 11) project downwardly from the annular air supply tube 142 within each of the cover members 140, and each nozzle tube 152 directs a stream or jet of air downwardly against the surface of the water within the tank chamber 125 at an angle A of approximately 45°. As illustrated in FIG. 10, eight nozzle tubes 152 are uniformly spaced around the annular supply tube 142 and are all angled in the same direction so that the air jets directed from the tubes produce a continuous horizontal circulation of the sewage water within each tank chamber 125 in a counterclockwise direction as indicated in FIG. 10.

The air which is directed into each of the tank chambers 125 within the space above the water surface and the underneath surface of the cover member, is exhausted from the tank chamber through an outlet tube 154 located within the center portion of each of the cover members 140. A cylindrical concrete riser tube or pipe 156 surrounds each of the outlet tubes 154 and projects upwardly above the ground level to provide a free discharge or exhaust of the air from each tank chamber into the atmosphere. Preferably, a conical cover member 158 is mounted on the upper end portion of each of the riser tubes 156 in spaced relation to avoid the possibility of foreign objects being dropped into the riser tube 156.

In one experimental sewage treatment system which was installed under ground in accordance with the embodiment shown in FIGS. 9-12, each of the tanks 120 had an overall diameter of approximately 12 feet and enclosed a volume of sewage water to a depth of approximately 2 feet. As a result of the large surface area exposure of the water, the air streams or jets discharged from the inclined nozzle tubes 152 are effective to produce two important functions or treatments. The first treatment results from the continuous circulation of the sewage water within each of the tanks 120 as a result of the air jets from the nozzle tubes 152. This relatively slow but continuous horizontal circulation of the water produces centrifuging of the more polluted water having a higher specific gravity causing it to move outwardly toward the outer sidewall 122 of the tank. In addition, since there is no vertical turbulence or circulation of the water within each tank, the heavier more polluted water settles toward the bottom of each tank. As a result, the purest water is within the top center portion of each tank chamber and overflows into the center discharge tube or pipe 128. The second important treatment of the air jets discharged from the nozzle tubes 152, is the diffusion of the air into the sewage water to provide aerobic digestion of the organic matter within the water. The large surface area exposure of the water and the generally circular flow of air over the entire surface of the water within each tank, produce highly effective diffusion of the air into the water. In addition, the slightly pressurized air above the water surface and the spray of water into the air space as a result of the air jets, contribute to effective diffusion of the air to the water.

From the drawings and the above description, it is apparent that a sewage treatment system constructed in accordance with the present invention provides desirable features and advantages. For example, it is apparent that the aerobic digesion system illustrated in the drawings, has no moving parts or perforated air injection tubes below the surface of the sewage water within each tank. Thus the system eliminates all of the problems associated with maintaining the operation of the moving parts or caused by clogging of the submerged air injection tubes. By providing each of the tanks with an area in horizontal cross-section substantially greater than its area in vertical cross-section, and preferably at least five times greater, a large area of the liquid sewage is exposed to the moving air so that there is substantial surface diffusion of the air into the sewage. This surface diffusion has been found to provide for effective digestion of all of the solid particles within a matter of hours.

As another advantage, the draft created by the chimney 40 provides for a natural flow of air through the tanks 20 and 50 so that aerobic digestion results in both of the tanks 20 and 50. That is, the air flow or draft of air up the chimney 40 as a result of the slight differential pressure between the difference in elevation of the air inlet duct 76 and the upper end of the chimney 38 and the venturi action created by air flowing over the upper end of the chimney 40, results in a natural flow of air through the tanks 20 and 50. This flow of air through the tanks 20 and 50 between the corresponding baffles 30 and 64 and the circular horizontal flow of the air within each of the tanks 120 result in a corresponding circulation of the water within each of the tanks, due to the frictional effects between the flowing air and the upper surface of the water.

Another important advantage is provided by the simplified construction and operation of the chlorinator unit 95. That is, the flow of the discharge effluent through the chlorine crystals 100 is effective to chlorinate the effluent at the desired rate. However, if the home owner forgets to add a new supply of chlorine crystals 100, the valve member 102 will close the discharge line 90. This assures that no effluent is discharged from the system unless the effluent is chlorine treated. It is to be understood that the chlorinator unit 95 is optional equipment and is not necessary for aerobic digestion of liquid sewage in accordance with the present invention.

It is also apparent that the chimney 40 may be constructed as a free standing unit rather than being supported by the outer wall of a building and be only a few feet high where there are significant air currents adjacent the ground. It is also possible to replace the draft created by the chimney 40 with a continuously operating motor driven fan which would be located in either the air inlet, as shown in FIG. 9, or in the air outlet duct. It is further apparent that either of the tanks 20 or 50 may be constructed in a different configuration, such as circular as shown in FIGS. 9–12, rectangular or in sections. However, the cylindrical configuration illustrated in FIGS. 9–12 is best suited for producing the continuous circulation of the water in response to the circular air flow above the water.

While the method and forms of apparatus herein described constitute preferred embodiments of the invention, it is to be understood that the invention is not limited to the precise methods and forms of apparatus described, and that changes may be made therein without departing from the scope and spirit of the invention.

The invention having thus been described, the following is claimed:

1. Apparatus for aerobically digesting organic matter within sewage water, comprising a substantially cylindrical tank including bottom, top and side walls defining an enclosed substantially cylindrical treating chamber, a sewage water inlet line for directing sewage water into said chamber, a water discharge line defining an outlet within the center portion of said chamber, said outlet being positioned to limit the water within said chamber at a level below said top wall of said tank to define an air space within said chamber above the surface of the water, air conduit means for supplying a flow of air into the air space adjacent said top wall of said tank, means for directing a flow of air downwardly against the surface of the water within said chamber and in a horizontal substantially circular path adjacent the surface of the sewage water to effect circulation of the sewage in a natural circular path around said outlet and for centrifugally moving the heavier more polluted water radially outwardly from said outlet while diffusing air into the water, and means defining an air discharge passage extending from the air space for exhausting the air circulated within the air space.

2. Apparatus as defined in claim 1 wherein said means for directing the flow of air against the surface of the water, comprise at least one air nozzle positioned at an inclined angle relative to the surface of the water.

3. Apparatus as defined in claim 1 wherein said top wall of said tank is formed by a substantially circular cover member, and said air discharge passage is disposed substantially within the center of said cover member.

4. Apparatus as defined in claim 1 wherein said means for directing the flow of air comprise a plurality of air tubes positioned adjacent said top wall of said tank, and said tubes being inclined relative to said top wall and the surface of the water within said tank chamber for directing a corresponding plurality of air streams against the water surface at an inclined angle.

5. Apparatus as defined in claim 4 including means defining a generally annular air supply passage within said top wall of said tank, and said air tubes extend from said air supply passage at peripherally spaced intervals.

6. Apparatus as defined in claim 5 wherein said means defining said generally annular air supply passage, comprise an annular tube embedded within said top wall of said tank.

7. Apparatus as defined in claim 1 including a series of said tanks and corresponding said air conduit and directing means, means connecting said water discharge line of each said tank to said water inlet line of the next successive said tank, and a common air supply unit connected to said air conduit means of each said tank.

8. Apparatus as described in claim 1 wherein said sewage water inlet line extends generally radially into said side wall of said tank, and means within said tank chamber for directing the water in a generally circular horizontal path within said chamber.

9. Apparatus for aerobically digesting organic matter within sewage water, comprising a substantially cylindrical tank including a substantially flat bottom and a substantially cylindrical side wall defining an enclosed substantially cylindrical treating chamber having an area in horizontal cross-section substantially greater than its area in vertical cross-section to expose a large surface area of the sewage water, a substantially circular and generally flat cover member mounted on said side wall, a sewage water inlet line for directing sewage water into said chamber, a water discharge line defining an outlet within the center portion of said chamber, said outlet being positioned to limit the water within said chamber at a level below said cover member to define an air space within said chamber above the surface of the water, air conduit means within said cover member for supplying a flow of air into the air space adjacent said top wall of said tank, means for directing a flow of air downwardly against the surface of the water within said chamber and in a horizontal generally circular path adjacent the surface of the sewage water to effect circulation of the sewage water in a horizontal circular path within said chamber and for centrifugally moving the heavier more polluted water radially outwardly from said outlet while diffusing air into the water, and means defining an air discharge passage for exhausting the air circulated within the air space.

10. Apparatus as defined in claim 9 wherein said air conduit means comprise at least one air supply tube positioned at an inclined angle relative to the surface of the water within said chamber.

11. A method of aerobically digesting the organic matter within sewage water, comprising the steps of introducing the sewage water into a substantially cylindrical chamber of an enclosed tank, introducing a plurality of air streams into an air space between the surface of the sewage water and the top wall of the tank, directing the air streams against the surface of the sewage water to effect horizontal circulation of the sewage water within the chamber and to diffuse air into the sewage water, and discharging the treated water from the center portion of said chamber through an outlet located adjacent the surface of the water.

12. A method of aerobically digesting organic matter within sewage water, comprising the steps of introducing the sewage water into a generally cylindrical enclosed tank chamber, supplying a flow of air into said chamber above the surface of the sewage water, directing the flow of air in a generally circular horizontal path adjacent the surface of the sewage water to effect circulation of the sewage in a generally circular horizontal path for centrifugally moving the heavier more polluted water radially outwardly within said chamber while diffusing air into the water, discharging the treated water from said chamber, and exhausting the air from said chamber.

13. A method as defined in claim 12 wherein at least a portion of the air flow is directed downwardly against the surface of the water at an inclined angle relative to the surface of the water.

14. A method as defined in claim 12 wherein the treated water is discharged from the center portion of said chamber through an outlet located adjacent the surface of the water.

15. A method as defined in claim 12 wherein the air is exhausted from said chamber through a passage defined within a removable cover member for the enclosed tank chamber.

16. A method as defined in claim 12 wherein the air is supplied to said chamber through a passage defined within a removable cover member for the enclosed tank chamber.

17. A method as defined in claim 12 including the step of directing the treated water within said tank chamber into a second generally cylindrical enclosed tank chamber, supplying a flow of air into said second chamber above the surface of the water, and directing the flow of air in a generally circular horizontal path over the surface of the water within said second chamber to effect continued circulation of the water and further aerobic digestion of the organic material within the sewage.

* * * * *